United States Patent
Kindorf et al.

[15] 3,653,618
[45] Apr. 4, 1972

[54] INSULATION PROTECTOR FOR PIPE HANGERS

[72] Inventors: Robert D. Kindorf, 448 Scenic Ave., Piedmont; David O. Kindorf, 6257 Girvin Drive, Oakland, both of Calif. 94611

[22] Filed: Jan. 12, 1970

[21] Appl. No.: 2,128

[52] U.S. Cl.............................................248/58, 248/223
[51] Int. Cl.......................................................F16l 3/02
[58] Field of Search....................248/58, 59, 62, 327, 48.2, 248/223

[56] References Cited

UNITED STATES PATENTS

| | | | |
|---|---|---|---|
| 3,539,137 | 11/1970 | March | 248/58 |
| 2,092,270 | 9/1937 | Anderson | 248/65 X |
| 2,761,640 | 9/1956 | Frater | 248/300 X |
| 3,122,346 | 2/1964 | Seiler | 248/62 |
| 3,167,286 | 1/1965 | Sherburne | 248/62 |

*Primary Examiner*—Chancellor E. Harris
*Attorney*—Fryer, Tjensvold, Feix, Phillips & Lempio

[57] ABSTRACT

A member of sheet material curved to conform to the external surface of pipe insulating material to protect the insulating material by distributing the weight of the pipe over a large area as compared to the relatively small area of narrow pipe hanger. The protector is designed to fit within a pipe hanger and to have means of very simple and inexpensive construction to secure it to the pipe hanger during the time between its installation in the hanger and the installation of the insulation material.

Various means have been devised for protecting pipe insulation at the areas where it is engaged by hangers which support the pipe and the insulation. The insulation is generally of relatively soft, light material designed to insulate against the flow of heat either to or from the pipe and its contents. It has very little strength particularly in compression to which it is subjected when it is disposed between a hanger and the pipe supported by a hanger.

2 Claims, 3 Drawing Figures

PATENTED APR 4 1972

3,653,618

INVENTORS
ROBERT D. KINDORF
DAVID O. KINDORF
BY Fryer Tinsworth
Feix Phillips & Lempio ATTORNEYS

INSULATION PROTECTOR FOR PIPE HANGERS

Various means have been devised for protecting pipe insulation at the areas where it is engaged by hangers which support the pipe and the insulation. The insulation is generally of relatively soft, light material designed to insulate against the flow of heat either to or from the pipe and its contents. It has very little strength particularly in compression to which it is subjected when it is disposed between a hanger and the pipe supported by a hanger.

The invention is disclosed in greater detail in the following specification where reference is made to the accompanying drawing.

IN THE DRAWING

Figure 1:
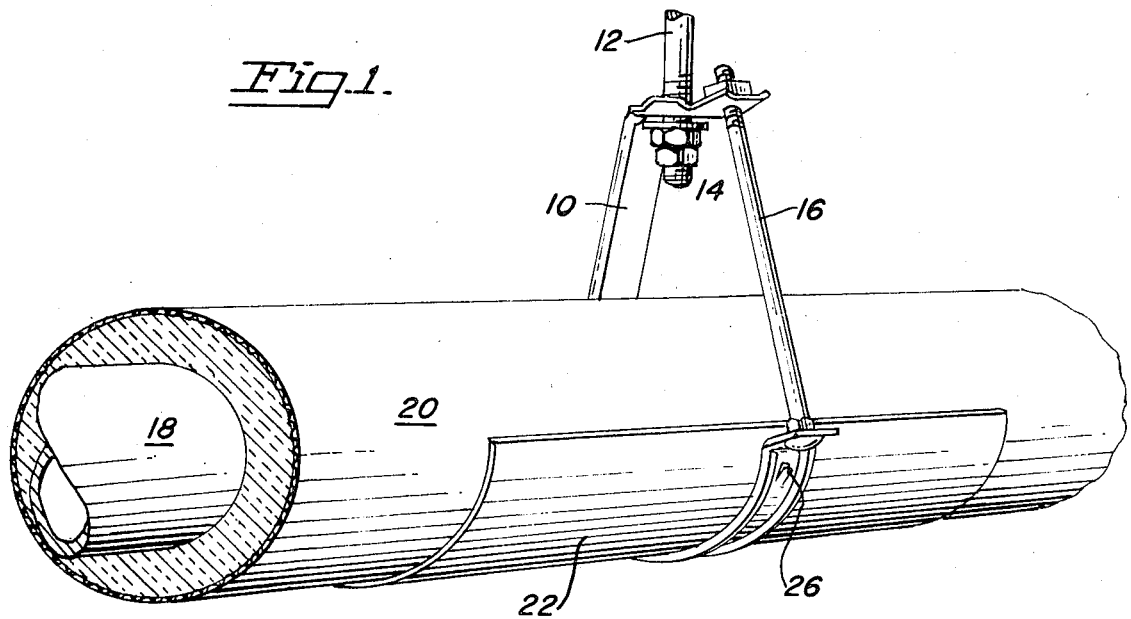
FIG. 1 is a perspective view of the pipe hanger supporting pipe with insulation thereon and a protective device between the insulation and the hanger said device being constructed in accordance with the present invention.

In FIG. 1, the pipe hanger is illustrated at 10 as supported by a rod 12 depending from a ceiling or other overhead structure and having nuts 14 to support and enable adjustment of the hanger. One side of the hanger is formed by a bolt 16 which is removable to enable the pipe to be placed within the hanger. A piece of pipe is shown at 18 as being surrounded by insulating material illustrated at 20 and protected by a curved plate 22 constructed in accordance with the present invention.

Figure 2:
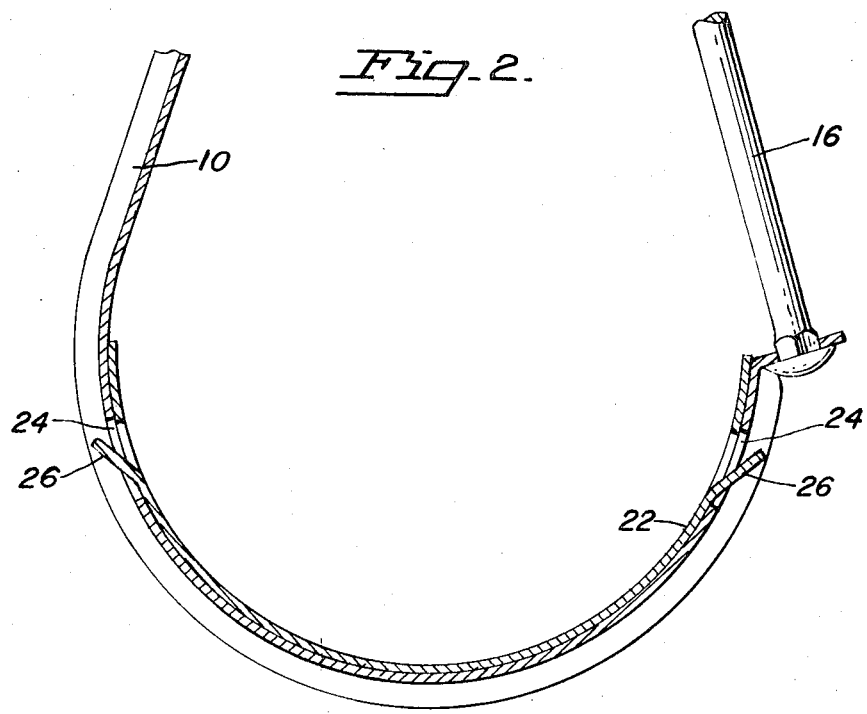
FIG. 2 is a longitudinal sectional view through the lower portion of a hanger and a protective device disposed therein also illustrating the invention.
Figure 3:
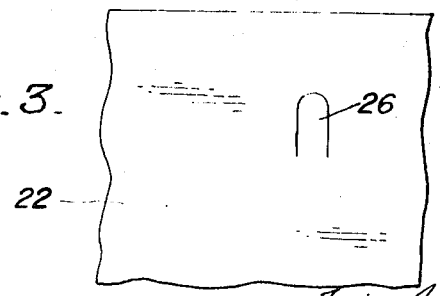
FIG. 3 is a fragmentary view in elevation of a portion of the protective device illustrating the configuration of a tab which is cut from the material of which the device is formed.

It is common practice to place the pipe in the hangers before installing insulation and several different and rather complex and costly types of protective devices are employed to prevent the insulation from being damaged as it is pressed against the relatively narrow hanger by the weight of the pipe. The protector of the present invention comprises the curved plate 22 which is installed in the hanger before the pipe is installed as shown in FIG. 2. To prevent displacement of the protector for the hanger during installation of the insulating material and also to center it with respect to the hanger, the hanger is provided with two elongated perforations as illustrated at 24 in FIG. 2 and the protector is provided with curved cuts forming tabs or punch-outs 26 (See also FIG. 3) capable of being bent out of the plane of the sheet material which forms the protector, as shown in FIG. 2, to cause them to project through the openings 24 in the hanger. Since there are two openings 24 in the hanger and two registering tabs 26 to extend therethrough, the protector is quite firmly held against accidental dislodgment during installation of the insulating material which is protected thereby.

In practice the tabs 26 are preferably pre-bent to outwardly projecting positions and the metal of which the protector is made is sufficiently resilient to enable the tabs to snap into position through the openings and assume their latching or retaining positions for holding the protector in the hanger.

Hangers vary considerably in configuration but many such, for example, as the so-called Clevis hanger have a curved strap-like portion which passes beneath the pipe and insulating material. It is apparent that the protector of the present invention can be combined with any hanger having such a curved configuration and disposed beneath the pipe.

What is claimed is:

1. In combination with a pipe hanger adapted to support a pipe having insulation thereabout of substantially cylindrical configuration, said pipe hanger having a relatively narrow support area conforming to the lower portion of the insulation, a resilient protective member fitting between the hanger and the insulation, the protective member being formed of sheet material having a smooth, relatively large surface area curved to conform to the surface of the insulation and to distribute weight of the pipe over a larger area of the insulation, and means for holding said protective member in place on the hanger pending installation of the insulation, said means comprising positively interlocking perforations and mating projections formed in substantially diametrically opposed and aligned relation in the hanger and protective member, said perforations and projections together with the resilience of the protect member cooperating for firmly latching the protective member in place on the hanger.

2. The combination of claim 1 in which said perforations are formed in the hanger, and the projections comprise punchout tabs on the protective member disposed for projection through said perforations.

* * * * *